July 7, 1953 W. A. BLACK 2,644,293
ELECTRIC CLOCK
Filed March 2, 1949 3 Sheets-Sheet 1
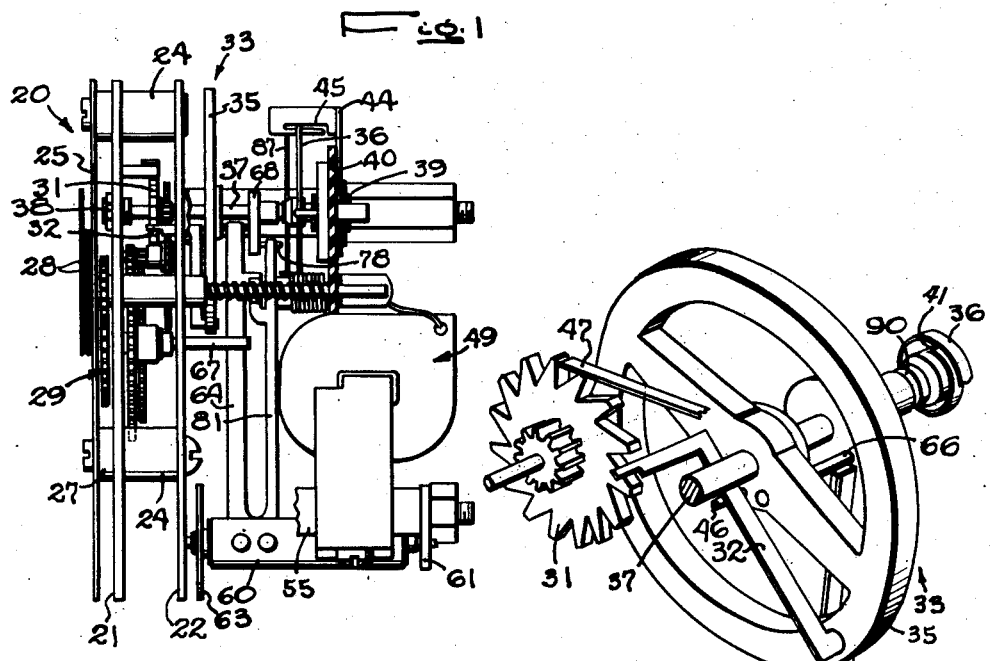
INVENTOR
WILLIAM A. BLACK
By Richard E. Burn
ATTORNEY July 7, 1953　　　　　W. A. BLACK　　　　　2,644,293
ELECTRIC CLOCK
Filed March 2, 1949　　　　　　　　　　3 Sheets—Sheet 2
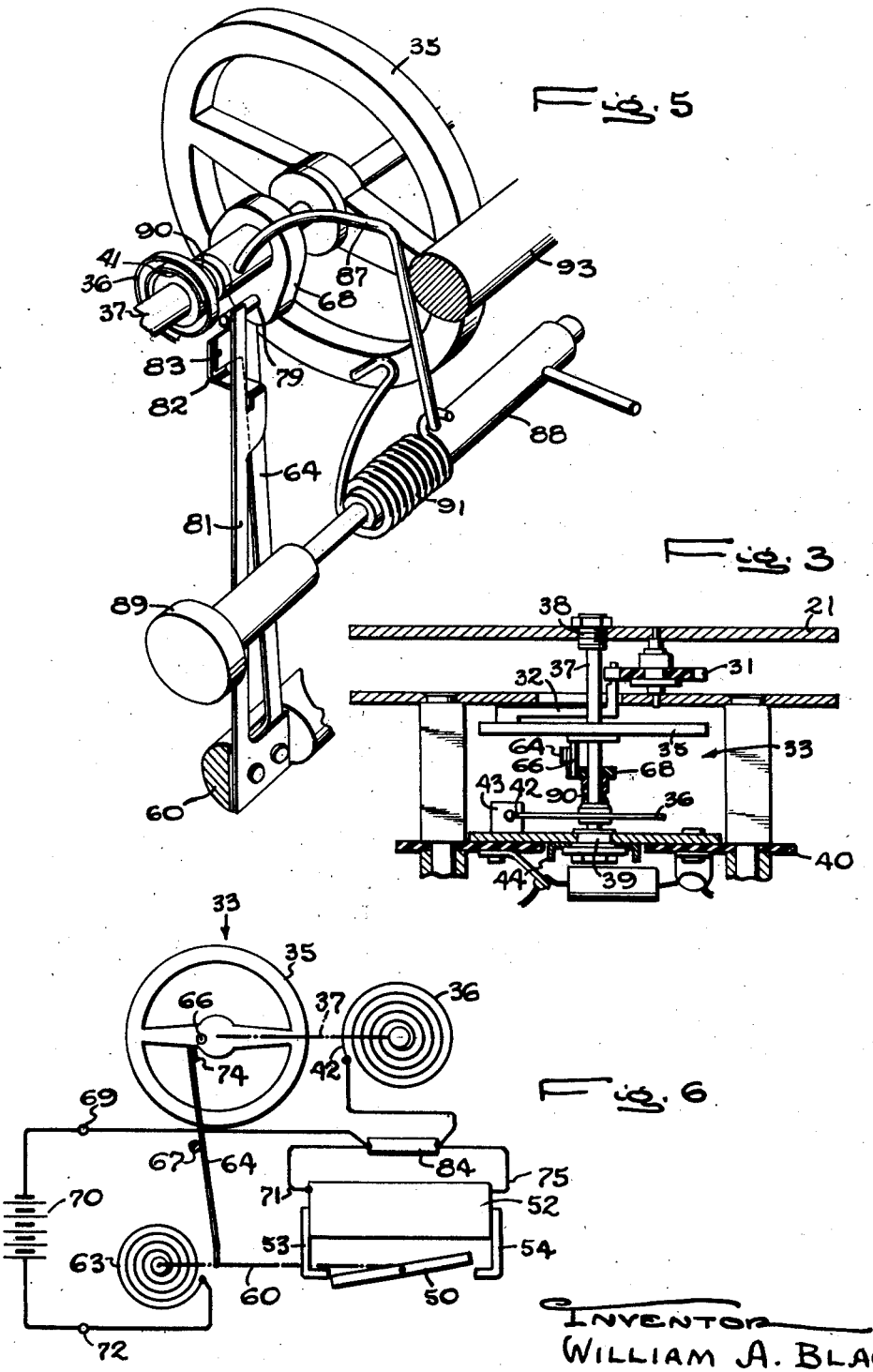
INVENTOR
WILLIAM A. BLACK
By Richard E. Burn
ATTORNEY July 7, 1953 W. A. BLACK 2,644,293
ELECTRIC CLOCK
Filed March 2, 1949 3 Sheets-Sheet 3

INVENTOR
WILLIAM A. BLACK
By Richard E. Burn
ATTORNEY

Patented July 7, 1953

2,644,293

UNITED STATES PATENT OFFICE 2,644,293

ELECTRIC CLOCK

William A. Black, Montclair, N. J., assignor to General Time Corporation, a corporation of Delaware Application March 2, 1949, Serial No. 79,285

12 Claims. (Cl. 58—28)

The present invention relates to electric clocks and more particularly to an impulse clock suitable for battery operation in automobiles.

It is an object of the present invention to provide an electric clock which inherently maintains a high degree of time keeping accuracy in spite of wide variations in battery voltage, an important feature in electric automobile clocks since the battery voltage normally varies to a wide range. It is another object to provide an impulse clock of durable construction capable of maintaining a high degree of accuracy over long periods of time under the adverse conditions of shock and vibration incident to automotive use. A further object is to provide an electric clock susceptible of simple and compact construction. A related object is to provide an electric clock using a minimum of parts all of which can be easily fabricated and readily assembled resulting in greatly reduced manufacturing costs. A more detailed object is to provide a direct current clock in which the magnetic armature and associated parts have a minimum of inertia, thereby reducing the power consumption to a minimum and permitting accurate functioning with a battery source for long periods of time without battery recharge or replacement. A correlative object is to provide an impulse clock which is quiet and smooth running.

Other objects and advantages of the invention will be apparent from the detailed description taken in connection with the accompanying drawings, in which:

Figure 1 is a side elevational view of a clock constructed in accordance with the present invention.

Fig. 2 is a rear elevational view.

Fig. 3 is a horizontal section looking downwardly along the section line 3—3 of Fig. 2.

Fig. 4 is a fragmentary perspective view showing the balance wheel and armature assemblies.

Fig. 5 is a perspective view similar to Fig. 4 showing the other side of the balance wheel and armature assemblies and including the starter.

Figure 7:
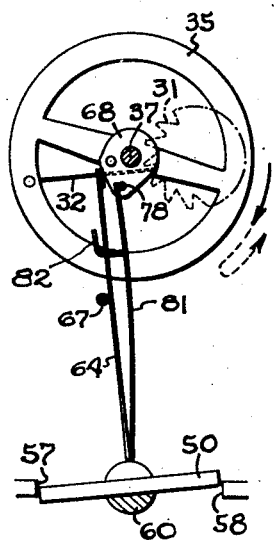

Fig. 6 sets forth the wiring diagram in more or less schematic form.

Figs. 7–12 are stop motion views showing the position of the armature and contacts as well as a direction of movement of the balance wheel in various periods in the operating cycle.

While the invention is susceptible of various modifications and alternative constructions and uses, I have shown in the drawings and will herein describe in detail one embodiment of the invention. It is to be understood, however, that I do not intend to limit the invention by such disclosure, but aim to cover all modifications and alternative constructions and uses falling within the spirit and scope of the invention as expressed in the appended claims.

Referring now to the figures, and particularly to Figs. 1 and 3, a clock 20 is shown having a frame which includes mounting plates 21 and 22 spaced from each other in parallel relation by posts 24. A clock face 25 is supported parallel to the plate 21 by suitable spacers 27. Time is conventionally indicated thereon by means of hands 28 which are driven in the usual manner by the gear train indicated generally at 29. The initial element of the gear train, in the present instance a ratchet wheel 31 having a pawl 32, is driven in unison with the balance assembly which is indicated generally at 33.

In the present embodiment of the invention the balance assembly includes a balance wheel 35 and a hairspring 36 both mounted on a balance shaft 37. The balance shaft 37 is pivoted for rotation in jeweled or other low friction bearings 38 and 39 which are respectively mounted on the plate 21 and an auxiliary mounting plate or balance bridge 40. The latter is preferably of electrical insulating material to insulate the parts of the balance assembly 33 from the frame of the clock for a reason which will be apparent. The front pivot of the balance shaft 37 is insulated from the plate 21 by the jeweled bearing 38 or other suitable means. The hairspring 36 has its inner end 41 connected to the balance shaft 37 and its outer end 42 anchored by a bracket 43 to the balance bridge 40 and is thus effective to cause the balance wheel 35 to rotate forwardly and backwardly in timed oscillations. Adjustment of the periodicity of the oscillations can be accomplished by varying the effective length of the hairspring 36. For this purpose an adjustable arm 44 which is rotatable about the balance shaft has a slot 45 formed therein which engages the outer convolution of the hairspring, and it will be clear that by rotating the arm 44 to a given angular position a vernier adjustment of the periodicity of the oscillations of the balance wheel is obtained.

The forward and backward movement of the balance wheel 35 reciprocates the pawl 32 mounted thereon to advance the ratchet wheel 31 intermittently. Thus, as the balance wheel rotates in a forward direction, the pawl 32 engages one of the teeth on the ratchet wheel forcing the ratchet wheel to revolve through the angle subtended by the engaged tooth before the pawl slips clear of the tooth. Such slipping clearly enables the balance wheel to overtravel and insures that the balance wheel is permitted free oscillation. On the backward portion of the cycle the pawl slides backwardly over the upper face of the succeeding tooth and drops against the stop pin 46 into position for engaging the working face of the succeeding tooth on the next cycle of the balance wheel. The click spring 47 bears against the faces of succeeding teeth as they move into top position of the ratchet wheel 31 and prevents retrograde movement of the ratchet wheel.

It will be apparent that an initial torque impulse applied to the balance wheel 35 will cause the balance assembly to oscillate through several cycles until frictional resistance dissipates the original energy imparted to the balance wheel. To supply additional energy to the balance wheel to replace the energy lost through friction, an electromagnet 49 and an armature 50 are provided. In the present instance the electromagnet 49 consists of a C-shaped pole piece having legs 53, 54 (see Fig. 2) and a coil 52 having many turns of wire wound about the center portion thereof. The electromagnet is positioned under the armature bridge 40 and is supported on the pillars 55 and 56, the latter being preferably of non-magnetic material. The legs of a pole piece have opposed pole faces 57 and 58 which are symmetrically located with respect to the balance shaft.

The armature 50 is arranged within the magnetc field of the electromagnet so that an electric current supplied to the coil of the electromagnet causes the armature to swing into an "energized" position. To this end the armature 50 which is of bar form is interposed between the pole faces 57 and 58 and is carried by a shaft 60 which is pivotally mounted in an armature bridge 61 and the plate 22. Means is also provided for moving the armature into a "deenergized" position when no electric current is energizing the electromagnet. In the present embodiment a helical spring 63 whose inner end is firmly affixed to the shaft 60 and whose outer end is anchored to the plate 22 serves to bias the armature into the deenergized position shown in Fig. 2.

The swinging movement of the armature 50 is utilized to apply a torque impulse to the balance wheel 35 by means of a force transmitting member which engages an eccentric rotatable with the balance wheel 35. In the present instance a resilient force member or impulse arm 64 of the leaf spring type is riveted or otherwise suitably mounted on the armature shaft 60 so that it extends upwardly toward the balance shaft 37. The upper end 65 of the impulse spring lies adjacent to the balance wheel 35 and is free to swing parallel to the face of the latter when the armature moves into and out of its energized position. The swinging motion of the impulse spring 64 is intercepted by an eccentric abutment or impulse pin 66 which is mounted in parallel spaced relation to the balance shaft 37. The impulse pin is supported by its ends in mounting holes in the hub of the balance wheel 35 and a collar 68. When the armature 50 is in its deenergized position, the impulse spring 64 assumes an "at rest" position out of the path of the movement of the impulse pin and lies against the banking pin 67. With the parts arranged as shown it will be apparent that the impulse spring 64, as it sweeps by the balance shaft 37 upon movement of the armature, will engage the impulse pin and apply a rotating movement to the balance wheel.

In accordance with the present invention means are provided for utilizing the impulse member for energizing the electromagnet. This is effectively accomplished by including in the electrical circuit for the electromagnet electrical contacts which are operated by engagement of the impulse spring 64 and the impulse pin 66. As shown schematically in Fig. 6, one terminal 69 of a battery 70 or other source of electric power is connected directly to one end 71 of the coil 52. The other terminal 72 of the battery is connected through the frame of the clock to the outer end of the helical spring 63. The helical spring conducts the current to the armature shaft 60 and thence to the impulse spring 64 on which an electrical contact 74 is welded or otherwise firmly attached. The second end 75 of the coil 52 is electrically connected to the insulated balance assembly 33 through the anchored end 42 of the hairspring 36. Therefore, upon initial engagement between the contact 74 on the impulse spring and the impulse pin 66, the circuit is completed energizing the electromagnet 49. Positive electrical contact is maintained between the impulse spring and the impulse pin after initial contact is made since the movement of the armature 50 into its energized position forces the impulse spring 64 against the impulse pin 66 intensifying the contact pressure. By thus utilizing the movement of the armature to provide positive electrical contact, chattering or bouncing of the contacts has been reduced to a minimum and a firm low-resistance connection is maintained.

Further, in accordance with the invention means are provided for drawing the impulse spring 64 into initial engagement with the impulse pin 66 when the latter reaches a suitable point in its path of travel. In the present embodiment initial pull-in of the impulse spring toward the impulse pin is caused by an eccentric abutment or wiper 78 mounted to rotate with the balance wheel 35 in an arcuate path adjacent the path of the impulse pin 66. The wiper 78 is preferably in the form of a pull-in pin projecting outwardly from the collar 68 in a direction parallel to the shaft 37. The collar 68 is preferably of insulating material to insulate the pull-in pin from the balance shaft 37 and the impulse pin 66 which are part of the electrical circuit of the electromagnet. Extending alongside the impulse spring 64 is a finger or pull-in spring 81 which, in the present instance, is in the form of a leaf spring. The upper end of the pull-in spring 81 lies within the path of movement of the pull-in pin 78 and the lower end is riveted or otherwise suitably fastened to the armature shaft 60 adjacent the impulse spring 64. The pull-in pin 78 is angularly positioned about the balance shaft 37 to contact the pull-in spring near the middle portion of the forward and backward rotation of the balance wheel 35. This positioning is in keeping with the good horological aspects of the clock mechanism since the interference caused by the engagement of the pull-in spring 81 and the pull-in pin 78 comes at the point in the cycle where the kinetic energy is a maximum and any effect on the timing of the oscillation on the balance wheel is correspondingly reduced.

Figure 8:
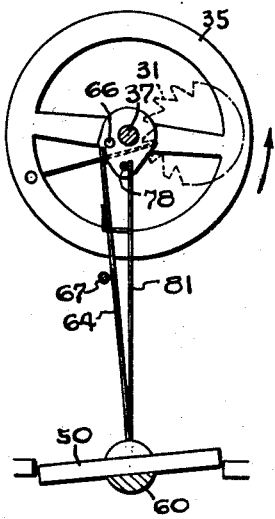

To enable the pull-in spring to perform its function of drawing the impulse spring 64 into engagement with the pin 66, a one-way force transmitting connection is provided between the two springs. This is preferably accomplished by forming a hooklike projection 82 near the upper end of the pull-in spring which engages a mating lateral projection 83 on the impulse spring. In operation, movement of the pull-in spring 81 to the right as shown in Fig. 8 draws the impulse spring 64 toward the path of the impulse pin 66, but movement of the pull-in spring 81 to the left has no effect whatsoever on the impulse spring. As will be made clear in reviewing the operation I prefer to position the pin 78 so that impact with the spring 81 occurs at or near a plane defined by the axes of the balance shaft 37 and the armature shaft 60. Preferably also the pull-in spring 81 extends into the path of the pull-in pin 78 far enough to bring the impulse spring 64 into initial contact with the impulse pin 66 yet permitting the pin 78 to slip past upon overtravel of the balance wheel.

It will be apparent from Fig. 8 that the impulse pin 66 is angularly positioned about the balance shaft in a trailing relation relative to the forward or counterclockwise direction of rotation, the angle being on the order of 90 degrees but preferably somewhat less than this value. This relationship is worthy of special note since it causes the impulse spring 64 to move inwardly relative to its pin 66 even though the pull-in spring 81 remains in contact with its cooperating pin 78 as it must during the pull-in operation. This will be apparent to one skilled in the art when it is considered that upon rotation of the balance shaft counterclockwise, the pull-in pin 78 has a maximum horizontal component moving at approximately right angles to the pull-in spring 81 while the horizontal component of the impulse pin 66 is a minimum. This permits the impulse spring 64 to "catch up with" its contact pin 66 to energize the electromagnet before the movement of the pull-in pin becomes appreciable and before any substantial amount of energy has been subtracted from the oscillating system. This relationship also allows the oscillation of the balance wheel to be independent of the speed at which the armature is energized since the initial impulse to the pin 66 has little effect on the rotational movement on the balance wheel as will become apparent in reviewing the operation.

The dual function of the impulse spring 64 as a force transmitting member and an electrical contact and the operation of the pull-in spring 81 will be made clear upon inspection of the stop motion views in Figs. 7-12. Fig. 7 shows the electromagnet deenergized and the balance wheel 35 finishing its backward rotation before beginning the forward portion of the cycle. The pull-in pin 78 is shown engaging the pull-in spring 81 and swinging it to the left with no accompanying motion of the impulse spring 64. The latter is in its rest position against the stop 67. Before the balance wheel reaches its extreme clockwise or backward position, the pull-in pin 78 slips clear of a pull-in spring 81 and allows it to return to its normal "start" position. At this time the hairspring is tensioned and thus stores considerable energy which causes the balance wheel to reverse and begin to rotate in the forward or counterclockwise direction. Fig. 8 shows the balance wheel shortly after starting its forward motion. The pull-in pin 78 has engaged the pull-in spring 81 and has started to swing it to the right to draw the impulse spring 64 toward the path of the impulse pin 66.

Figure 9:
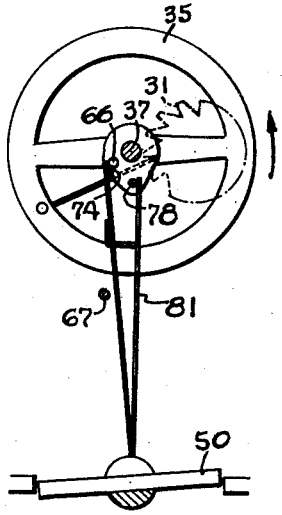
Figure 10:
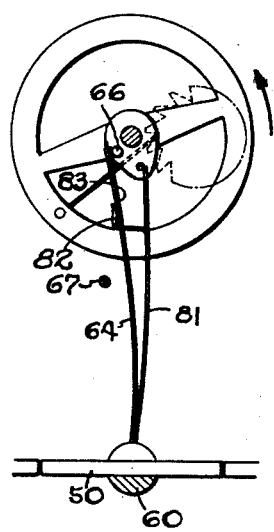

Next in the sequence of operation, Fig. 9 shows the position of the balance wheel 35 at the moment that the impulse pin 66 and the contact 74 on the impulse spring come into engagement, closing the electrical circuit for the electromagnet. In Fig. 10, the position of the balance wheel is shown at a short interval of time after Fig. 9. The armature 50 is now in the energized position. The movement of the armature has caused the impulse spring 64 to be resiliently bowed since forward movement of its upper end is prevented by engagement with the impulse pin 66. The pull-in spring 81 has also assumed a bowed position since the lateral projections 82 and 83 prevent forward movement of its upper end without corresponding movement of the impulse spring. Thus energization of the armature has caused resilient energy to be stored in both the impulse and pull-in springs as is shown by their deformation. As the balance wheel continues in its forward rotation, this stored energy is imparted to it since the impulse and pull-in springs act to apply force against the impulse pin until they have regained their normal unflexed condition.

The elasticity of the impulse and pull-in springs and the inertia of the balance wheel allows the armature to snap into its energized position with substantially no accompanying movement of the balance wheel. Preferably the coil 52 and its associated magnetic circuits are designed to give almost instantaneous movement of the armature into its energized position upon closing the electrical circuit. There will, of course, be some delay as the magnetic flux builds up; however, the speed of response of the armature is so rapid as compared to the rotational velocity of the balance wheel that the response is for practical purposes instantaneous over a wide range of supply voltage. Since the armature snaps quickly into its energized position with little corresponding movement of the balance wheel, it will be seen that the impulse and pull-in springs will be deformed to a predetermined degree. This deformation, which is constant for each cycle of operation, causes a fixed amount of energy to be imparted to the balance wheel at each impulse.

The impulse imparted to the balance wheel 35 is independent of armature speed and consequently of the voltage supplied to the electromagnet 49 for another reason, namely, the specific angular positioning of the impulse pin 66 at the moment of initial contact. As clearly seen in Fig. 10, by positioning the impulse pin in trailing angular relation to the pull-in pin on the order of 90 degrees, the initial force on the impulse pin contains a large radial component. In this manner the initial force is largely dissipated by the bearings of the balance shaft and only a small component of the initial force tends to rotate the balance wheel. However, as the balance wheel continues in the forward or counterclockwise direction, the radial component of force decreases and the tangential component correspondingly increases thereby making effective use of the energy stored in the impulse and pull-in springs to rotate the balance wheel.

Figure 11:
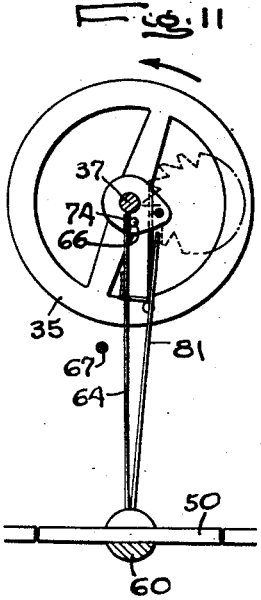
Figure 12:
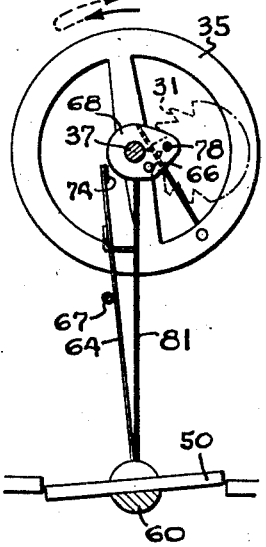

Fig. 11 shows the position of the balance wheel at the moment the impulse and pull-in springs have resumed their normal unflexed condition. The impulse pin is shown about to break contact with the impulse spring. By comparing the relative positions of the impulse pin 66 on the contact surface 74, it will be noted that the impulse pin has wiped across a considerable portion of the contact surface between the time of initial contact, as shown in Fig. 9, and the time of breaking contact, as shown in Fig. 11. This wiping action insures positive electrical contacts since not only does the wiping clean the surfaces but also isolates the point at which the electrical circuit is closed from that at which the circuit is broken. The overtravel of the balance wheel as shown in Fig. 12 causes the impulse pin to move away from the impulse spring deenergizing the electromagnet and allowing the armature to return to its deenergized position under the influence of the biasing spring 63. Rotation of the balance wheel into its limit position causes storage of energy in the hairspring 36 and consequent reversal of movement as indicated by the dotted arrow. Continued movement of the balance wheel in the backward or clockwise direction causes the pull-in pin 78 to slightly deflect the pull-in spring preparatory to wiping by the same. This brings us back to the condition shown in Fig. 7, and the cycle is repeated as long as electric current is supplied to the magnet coil 52.

Arcing at the contact surfaces as the electrical circuit for the magnet coil is opened and closed will ordinarily be very minor. However, if desired, a resistor 84 may be placed across the coil 52. The value of this resistor is not critical and may be determined by anyone skilled in the art. If desired, means may be provided for imparting an initial impulse to the balance wheel in order to put the clock into operation. Conveniently this is done by the spring wire sweep 87 mounted on a twistable starter shaft 88. The knurled grip 89 allows the arcuate end portion of the sweep 87 to be manually rotated into frictional engagement with a grooved sleeve 90 on the balance shaft 37. A coil spring 91 operates upon release of manual pressure to draw the sweep wire 87 upwardly through the groove of the sleeve 90 frictionally imparting an initial torque impulse to the balance assembly.

I claim as my invention:

1. In an electric clock having a time indicating means, a driving mechanism comprising a balance wheel, a hairspring connected to said balance wheel for causing oscillation of the latter, a gear train driven in unison with said balance wheel for operating said indicating means, an electromagnet having an armature cooperating therewith and movable into an energized and a deenergized position, an eccentric projection movable with said balance wheel, a resilient member actuated by said armature and having a free end positioned to impel said eccentric projection in a forward direction, an electrical circuit for said electromagnet including said eccentric projection and said resilient member so that said electromagnet is energized upon contact thereof, a wiper rotatable with said balance wheel, a finger arranged for engagement by said wiper during a portion of the path of movement of the latter so that said finger is swung in a forward direction upon rotation of said wiper, said finger including means for moving said resilient member into initial contact with said eccentric projection upon rotation of said wiper so that said electromagnet is energized and a resilient impulse applied to said projection by said resilient member, and biasing means for returning said armature to a deenergized position upon overtravel of said balance wheel and movement of said projection away from said resilient member.

2. In an electric clock of the impulse type, a driving mechanism comprising a balance wheel, a hairspring connected thereto to oscillate the same forwardly and backwardly between extreme positions, an eccentric associated with said balance wheel, means including an electromagnet and an impulse arm actuated thereby for engaging said eccentric and imparting a rotative impulse to said balance wheel in the forward direction, means for biasing said arm normally out of engagement with said eccentric, electric circuit means including said arm and said eccentric for energizing said electromagnet, a wiper associated with said balance wheel, means including a pull-in finger arranged for lateral engagement by said wiper for pulling said impulse arm laterally in the direction of said eccentric, said wiper and eccentric being angularly so positioned with respect to the extremes of movement of said balance wheel that the lateral movement imparted to the pull-in finger by the wiper at the beginning of forward movement exceeds the movement of the eccentric laterally away from said impulse arm so that the latter is pulled into initial electrical engagement with the eccentric.

3. In an electric clock having time indicating means, a driving mechanism comprising a balance wheel, a hairspring connected to said balance wheel for oscillating the same, means driven in unison with the oscillations of said balance wheel for operating said indicating means, an electromagnet having an armature movable between an energized and deenergized position, means including a force transmitting member and an eccentric for applying a rotative impulse to said balance wheel upon movement of the armature into its energized position, means operative during the portion of the movement of said balance wheel prior to said impulse for drawing said force transmitting member into engagement with said eccentric, means including electrical contacts operated as a result of said engagement for energizing said electromagnet, and means operative upon overtravel of said balance wheel and breaking of said engagement for restoring said armature to its deenergized position.

4. In an electric clock having a time indicating means, a driving mechanism comprising a balance wheel having an eccentric associated therewith, a hairspring connected to said balance wheel for oscillating the same at a timed rate, means driven in unison with the oscillations of said balance wheel for operating said indicating means, an electromagnet having an armature movable between an energized and a deenergized position, means including a first leaf spring actuated upon movement of the armature into its energized position for engaging said eccentric and applying a rotative impulse to said balance wheel, means including a second leaf spring arranged parallel to said first leaf spring and operatively associated with said balance wheel for drawing said first leaf spring into light initial engagement with said eccentric, electric circuit means including said first leaf spring and said eccentric for energizing said electromagnet thereby to bring said first leaf spring into firm impulsing engagement with said eccentric, and a biasing spring operative upon overtravel of said balance wheel and consequent breaking of the electrical circuit for restoring said armature to its deenergized position.

5. In an electric clock having time indicating means, a driving mechanism comprising a balance wheel, a hairspring connected to said balance wheel for oscillating the same, means driven in unison with the oscillations of said balance wheel for operating said indicating means, an electromagnet having an armature movable between an energized and a deenergized position, an eccentric rotatable with the shaft of the balance wheel, a resilient member arranged so that its free end is actuated by said armature and positioned so that it is in the path of movement of said eccentric when said armature is in its energized position and out of the path of said eccentric when said armature is in the deenergized position, an electric circuit for said electromagnet including said resilient member and said eccentric, and means operated by said balance wheel for moving said resilient member into initial contact with said eccentric so that said electromagnet is energized and an impulse applied to said projection by said resilient member.

6. In an electric clock having time indicating means, a driving mechanism comprising a balance wheel, a hairspring having its inner end connected to said balance wheel, a gear train having a pawl and ratchet wheel driven by said balance wheel for advancing said time indicating means, an electromagnet having opposed pole faces, an armature pivoted for rotation into and out of engagement with said pole faces, a spring for biasing the armature into a deenergized position, a leaf spring mounted on said armature for swinging movement in a plane parallel to said balance wheel with its free end movable toward the axis thereof upon the energization of the armature and away from said axis under the action of the biasing spring, a pin on said balance wheel spaced from the axis thereof and arranged in the path of movement of said leaf spring so that a torque impulse is resiliently applied to the pin on said balance wheel by said leaf spring upon energization of the electromagnet, said pin being arranged so that its path of movement does not intercept said leaf spring when said armature is in the deenergized position, an electrical circuit for said electromagnet including said leaf spring and said pin and means operated by said balance wheel for moving said leaf spring into initial contact with said pin so that said electromagnet is energized.

7. In an electric clock having time indicating means, a driving mechanism comprising a balance wheel, a hairspring connected to said balance wheel for oscillating the same, means driven in unison with the oscillations of said balance wheel for operating said time indicating means, an electromagnet having an armature movable into an energized and deenergized position, means for biasing the armature into a deenergized posisition, means including a resilient member and an eccentric for applying a rotative impulse to said balance wheel upon movement of said armature into its energized position, said eccentric being so arranged with respect to said resilient member that the initial portion of said impulse contains a large radial component of force and a smaller tangential component with the radial component decreasing and the tangential component increasing relative thereto as the balance wheel is urged toward its opposite extreme position, said resilient member being of sufficient elasticity and said balance wheel having sufficient inertia to allow said armature to snap into its energized position with substantially no immediate accompanying movement of said balance wheel, said resilient member being positioned out of the path of movement of said eccentric when said electromagnet is in the deenergized position, an electrical circuit for said electromagnet including said resilient member and said eccentric, and means associated with said balance wheel to move said resilient member into contact with said eccentric so that said electromagnet is energized.

8. In an electric clock having time indicating means, a driving mechanism comprising a balance wheel, a hairspring having its inner end connected to said balance wheel, a gear train driven in unison with said balance wheel for operating said indicating means, an electromagnet having opposed pole faces, an armature pivoted adjacent said pole faces for swinging movement into an energized position, a biasing spring for returning the armature to a deenergized position, a leaf spring mounted on the armature for swinging movement parallel to the face of said balance wheel with its free end movable generally toward the axis thereof upon swinging of the armature into an energized position and away from said axis under the influence of said biasing spring, an eccentric projection on said balance wheel spaced from the axis thereof and arranged in the path of movement of said leaf spring, said eccentric projection being arranged so that it will not interfere with said leaf spring when the armature is in the deenergized position, an electrical circuit for said electromagnet including contacts operated by said leaf spring and said eccentric projection so that upon successive engagement between said leaf spring and said eccentric projection successive torque impulses are resiliently applied to the eccentric projection on said balance wheel and means operated by said balance wheel for initially contacting said leaf spring with said eccentric during each cycle whereby said electromagnet is energized.

9. In an electric clock having time indicating means, a driving mechanism comprising a balance wheel, a hairspring connected to said balance wheel, means driven in unison with the rotation of said balance wheel for operating said time indicating means, an electromagnet including an armature movable between an energized and deenergized position, biasing means for moving the armature into the deenergized position, an impulse member mounted remote from said balance wheel and having a free end extending adjacent said balance wheel and arranged for actuation by the armature, an eccentrically mounted projection on the shaft of the balance wheel arranged in the path of movement of the free end of said impulse spring, said projection being arranged to follow a path that will not intercept said impulse spring when the armature is in the deenergized position, an electrical circuit for said electromagnet including electrical contacts operated upon engagement between said impulse spring and said projection for energizing the electromagnet so that a torque impulse is resiliently applied to the balance wheel in the forward direction by said impulse spring, and means operated by the balance wheel after the return movement thereof for bringing the impulse spring and the projection again into engagement, thereby producing repeated impulsing of said balance wheel at a timed rate.

10. In an electric clock having time indicating means, a driving mechanism comprising a balance wheel, a hairspring connected to said balance wheel for oscillating the same, a gear train having a pawl and ratchet wheel driven in unison with the oscillation of said balance wheel for advancing said time indicating means, an electromagnet having pole faces of opposite polarity, an armature pivoted for rotation into and out of engagement with said pole faces, a spring for biasing the armature into a deenergized position, a leaf spring mounted on said armature for swinging movement in a plane parallel to said balance wheel with its free end movable toward the axis thereof upon the energization of the armature and away from said axis to a backed-off position under the influence of the biasing spring, an eccentric rotatable with said balance wheel and arranged in the path of movement of said leaf spring so that a torque impulse is resiliently applied thereto by said leaf spring upon energization of the electromagnet, auxiliary means actuated by said balance wheel for bringing said leaf spring from its backed-off position into engagement with said eccentric, and electrical circuit means including surfaces brought into contact as an incident to the engagement of the leaf spring with said eccentric for energizing said electromagnet.

11. In an electric clock having time indicating means, a driving mechanism comprising a balance wheel, a hairspring connected to said balance wheel for oscillating the same, means driven in unison with the oscillations of said balance wheel for operating said indicating means, an electromagnet including an armature movable into an energized position, biasing means for returning the armature to its deenergized position, a resilient member mounted remote from said balance wheel having a free end arranged for actuation by the armature, an eccentric mounted for rotation with said balance wheel and arranged in the path of movement of the free end of said resilient member, and also arranged so that the path of movement of the eccentric will not intercept said resilient member when said armature is in its deenergized position, an electrical circuit including electrical contacts operated by engagement of said resilient member and said eccentric for energizing the electromagnet so that a torque impulse is resiliently applied to the eccentric by said resilient member, said contacts being so arranged that said impulse forcibly holds them in closed condition until overtravel of the balance wheel and continued movement of the eccentric causes breaking of the circuit and means associated with said balance wheel for causing an initial contact of said electrical contact.

12. In an electric clock having time indicating means, a driving mechanism comprising a balance wheel, a hairspring having its inner end connected to said balance wheel for causing periodic forward and backward rotation of the latter, a gear train driven in unison with the movement of said balance wheel for operating said time indicating means, an electromagnet having opposed pole faces, an armature pivoted for rotation into an energized position with respect to said pole faces, a spring for biasing the armature into a deenergized position, an impulse pin eccentrically mounted on said balance wheel, an impulse leaf spring mounted on said armature for swinging movement in a plane parallel to said balance wheel with its free end movable into forward impulsing engagement with said impulse pin upon energization of the the armature and movable in a backward direction under the influence of the biasing spring to an at-rest position out of the path of said impulse pin, an electrical circuit including said impulse pin and said impulse spring for energizing said electromagnet, a pull-in pin eccentrically mounted on said balance wheel and rotatable therewith, a pull-in spring mounted on said armature for swinging movement in a plane parallel to said balance wheel with its free end engageable by said pull-in pin during the forward movement thereof, means including a hook member for urging said impulse spring forwardly into contact with said impulse pin upon forward displacement of said pull-in spring, said pins being positioned about the axis of said balance wheel so that upon continued forward rotation of the balance wheel said pull-in pin slips clear of said pull-in spring and said impulse pin advances past the forward limit of movement of said impulse spring breaking the circuit and permitting the balance wheel to swing back to its initial position.

WILLIAM A. BLACK.

References Cited in the file of this patent

UNITED STATES PATENTS

| Number | Name | Date |
|---|---|---|
| 381,856 | Sibley | Apr. 24, 1888 |
| 1,329,083 | Jamin | Jan. 27, 1920 |

FOREIGN PATENTS

| Number | Country | Date |
|---|---|---|
| 670,086 | France | Aug. 12, 1929 |